US011523279B2

(12) United States Patent
Lampin et al.

(10) Patent No.: US 11,523,279 B2
(45) Date of Patent: Dec. 6, 2022

(54) DATA TRANSMISSION BETWEEN A TERMINAL AND AN ASSOCIATED SERVER

(71) Applicant: ORANGE, Issy-les-Moulineaux (FR)

(72) Inventors: Quentin Lampin, Chatillon (FR); Dominique Barthel, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 437 days.

(21) Appl. No.: 16/620,311

(22) PCT Filed: Jun. 6, 2018

(86) PCT No.: PCT/FR2018/000160
§ 371 (c)(1),
(2) Date: Dec. 6, 2019

(87) PCT Pub. No.: WO2018/224740
PCT Pub. Date: Dec. 13, 2018

(65) Prior Publication Data
US 2020/0154274 A1    May 14, 2020

(30) Foreign Application Priority Data

Jun. 7, 2017   (FR) ...................................... 1755063

(51) Int. Cl.
*H04W 12/08*   (2021.01)
*H04W 76/10*   (2018.01)
(Continued)

(52) U.S. Cl.
CPC ....... *H04W 12/08* (2013.01); *H04W 12/0433* (2021.01); *H04W 76/10* (2018.02); *H04W 88/16* (2013.01)

(58) Field of Classification Search
CPC . H04W 88/16; H04W 12/0433; H04W 76/10; H04W 12/08
(Continued)

(56) References Cited

U.S. PATENT DOCUMENTS 9,100,236 B1 *  8/2015  Shetty ..................... H04L 29/06
9,345,061 B1 *  5/2016  Evans ..................... H04W 4/14
(Continued)

FOREIGN PATENT DOCUMENTS

EP     2533466 A1    12/2012
WO  2017082955 A1     5/2017

OTHER PUBLICATIONS

International Search Report dated Sep. 26, 2018 for corresponding International Application No. PCT/FR2018/000160, filed Jun. 6, 2018.
(Continued)

*Primary Examiner* — Josnel Jeudy
(74) *Attorney, Agent, or Firm* — David D. Brush; Westman, Champlin & Koehler, P.A.

(57) ABSTRACT

A transmission device suitable for communicating via a radio link with a gateway equipment of a telecommunications network and configured to communicate with a management server. The device is able to obtain authentication data associated with a terminal configured such that it connects with an application server to: set up a communication session with the terminal; to transmit session set-up data to the management server in order to register the terminal in a list of connected terminals; and to receive and retransmit a data message transmitted by the terminal or by the application server. A transmission method implemented by the transmission device. A management server and a management method implemented by the server.

13 Claims, 3 Drawing Sheets

(51) Int. Cl.
*H04W 12/0433* (2021.01)
*H04W 88/16* (2009.01)

(58) Field of Classification Search
USPC .......................................................... 726/6
See application file for complete search history.

(56) References Cited

U.S. PATENT DOCUMENTS

| | | | |
|---|---|---|---|
| 9,477,517 B2* | 10/2016 | Naveh | H04L 63/0876 |
| 2011/0235595 A1* | 9/2011 | Mehta | H04W 8/082 |
| | | | 370/329 |
| 2015/0312284 A1* | 10/2015 | Mihara | H04L 65/4038 |
| | | | 370/260 |
| 2016/0072806 A1 | 3/2016 | Kim et al. | |
| 2016/0150023 A1* | 5/2016 | Umehara | H04L 65/1069 |
| | | | 709/228 |
| 2017/0372600 A1* | 12/2017 | Palin | H04M 1/72412 |

OTHER PUBLICATIONS

Written Opinion of the International Searching Authority dated Sep. 26, 2018 for corresponding International Application No. PCT/FR2018/000160, filed Jun. 6, 2018.

Anonymous: "Getting started with LoraWAN, TheThingsNetwork and PlatformIO", ThingForward, Sep. 27, 2017 (Sep. 27, 2017), XP055447807.

N. Sornin et al., "LoRaWAN Specification", LoRa™ Alliance, dated Jul. 2016, Version V1.0.2, 70 pages.

English translation of the Written Opinion of the International Searching Authority dated Dec. 5, 2018 for corresponding International Application No. PCT/FR2018/000160, filed Jun. 6, 2018.

* cited by examiner

DATA TRANSMISSION BETWEEN A TERMINAL AND AN ASSOCIATED SERVER

CROSS-REFERENCE TO RELATED APPLICATIONS

This Application is a Section 371 National Stage Application of International Application No. PCT/FR2018/000160, filed Jun. 6, 2018, the content of which is incorporated herein by reference in its entirety, and published as WO 2018/224740 on Dec. 13, 2018, not in English.

FIELD OF THE DISCLOSURE

The invention lies in the field of telecommunications.

The invention relates more particularly to a communication system in which a terminal communicates with an application server able to provide application services to this terminal via a telecommunications network, and more particularly a server of this network. There is no limit attached to the nature of the terminal or to the nature of the application services that are provided. The terminal may be a fixed or mobile terminal, such as an electricity meter, a sensor, etc. The application server may be operated by any service provider, such as for example an electricity supplier, water supplier, etc.

The invention is also applied preferably, but without limitation, in the context of the Internet of Things, and in particular LoRaWAN™ (for "Long Range Wide Area Network") architectures or wide-area networks. As is known, the LoRaWAN™ protocol being standardized allows low-bitrate radio communication (less than 50 kbit/s) with low power consumption for objects communicating using LoRa™ (for "long range") technology that are connected to the Internet via a communication network.

BACKGROUND OF THE DISCLOSURE

In a LoRaWAN™ architecture, each terminal is required to communicate with an application server via a telecommunications network. More particularly, the data sent by each terminal, via a radio link, are received by a plurality of gateways or base stations which relay said data to a server of the network, via a wired or cellular connection. This server of the network filters the messages received from the terminals (and in particular checks their origin and their integrity), and forwards them to the application servers in question.

Despite radio technology optimized for long range, many sensors designed to operate using LoRa™ technology fail to communicate with the gateways of the desired Lora™ network because the signals sent by these sensors do not reach the gateways. These sensors are for example positioned in areas such as basements, cellars, sheet metal buildings, etc.

As is known, additional gateways may be added to the Lora™ network in order to allow these sensors to communicate with this network.

However, these gateways are expensive. In addition, they require a mains connection and a cellular or wired connection.

SUMMARY

One of the aims of the invention is to rectify inadequacies/drawbacks of the prior art and/or to make improvements thereto.

To this end, the invention relates to a transmission device able to communicate via a radio link with a gateway equipment forming a node of a telecommunications network and configured so as to communicate with a management server via said gateway equipment and a network server of said network.

According to the invention, the transmission device comprises:

an obtainment module configured so as to obtain first authentication data associated with at least one terminal identifier, a said terminal identifier identifying a terminal configured so as to connect to an application server via said network server;

an authentication module configured so as to establish a communication session between said transmission device and said terminal using at least one of the first items of authentication data that are obtained;

a sending module configured so as to send establishment data for said session, said data being intended for said management server, said management server being able to command, following the reception of said data, recording of information relating to the established session in association with the identifier of the terminal in a memory accessible to the network server;

a reception module configured so as to receive a data message sent by said terminal and intended for said application server and to receive a data message generated by the application server or the network server and intended for the terminal; and a transfer module configured so as to send said received data message.

In correlation, the invention also relates to a transmission method as described above.

According to the invention, the method comprises the following steps:

obtaining first authentication data associated with at least one terminal identifier, a said terminal identifier identifying a terminal configured so as to connect to an application server via said network server;

establishing a communication session between the transmission device and the terminal using at least one of the first items of authentication data that are obtained;

sending establishment data for said session, said data being intended for said management server, said management server being able to command, following the reception of said session establishment data, recording of information relating to the established session in association with the identifier of the terminal in a memory accessible to the network server;

receiving a data message sent by the terminal and intended for said application server and/or a data message generated by the application server or the network server and intended for the terminal; and sending said received data message.

A transmission device, also called repeater device, is positioned in the radio coverage area of a terminal in order to allow this terminal to access the network and to communicate with an application server. By virtue of this transmission device, a terminal that is configured so as to connect to the network but that is not able to directly access a gateway equipment of the network via a radio link is able to communicate with an application server.

The network is for example a LoRa™ network.

The transmission device behaves like a terminal with respect to the network. It thus communicates with a gateway equipment via radio signals, for example long-range radio signals. The gateway equipment relays the information coming from the transmission device to a management server via one or more servers of the network. In turn, the information from the management server and intended for the transmission device is transmitted to this device via the network server or servers and via the gateway equipment.

Advantageously, the communication links between the various servers and between a server of the network and a gateway equipment are conventional wired or cellular links There is however no limit associated with the type of these links Advantageously, the link between the device and the terminal is a long-range radio link using LoRa technology. Terminals configured so as to comply with the LoRaWAN™ protocol are thus able to access application servers via a LoRa network without it being necessary to adapt them.

However, the link between the device and the terminal may be a radio link having different characteristics, for example a short-range radio link In one embodiment, a communication session is established between the transmission device and a management server, which represents an application server associated with the transmission device.

This session establishment may comprise mutual authentication between the transmission device and the management server and/or be based on shared secrets, typically a key.

This session is for example established following the sending, by the transmission device, of a connection request to a management server via the network.

The transmission device acts as proxy for the network and responds to network connection requests from the terminals for which it has received rights. These rights are for example in the form of authentication data. By virtue of the acquired rights, the transmission device is able to establish a communication session with this terminal instead of a network server and/or an application server.

The transmission device also transmits session establishment data to the management server. These data are data used to establish the communication session between the terminal and the transmission device. As explained further below, these data are data generated by the terminal and communicated thereby to the transmission device, or data generated by the transmission device.

The management server interprets the reception of these data as proof that the terminal is connected to the network. It then informs the network server of this connection by communicating to it information relating to this connection. This information is recorded in a memory accessible to the network server. The network server will thus not reject the messages intended for the application server sent by this terminal.

The session establishment data may also be transmitted to the application server by the management server.

Following the provision of the session establishment data by the management server, the network server and the application server have the same information that would have been obtained by the network server and the application server in the case of a direct connection of a terminal to a gateway, that is to say in the case of a terminal situated in the coverage area of a gateway equipment.

Advantageously, the recorded connection information contains the session key or keys generated for this connection. By virtue of this session key, the network server is able to authenticate, encrypt and decrypt the data messages from or to the terminal and forwarded in each direction by the transmission device.

After this connection phase, the transmission device forwards, via the network to the application server, the messages intended for this application server and sent by the terminal. Symmetrically, the transmission device forwards, to the terminal, the messages intended for this terminal and transmitted via the network by the application server. Equivalently, the transmission device forwards, to the network server, the messages intended for this network server and sent by the terminal, as well as the messages from the network server to the terminal.

This transmission device thus allows the terminal to communicate with the network and the application server to which it is attached. It thus performs the role of a relay.

No changes are necessary in terms of the terminal.

The transmission device is inexpensive. It is not necessary for it to comprise a wired or cellular connection module. It communicates with one or more terminals, on the one hand, and with a network gateway, on the other hand, via a radio link This communication means has low power consumption for the transmission device. It is thus not necessary to connect the transmission device to an electricity outlet. A battery or cells are enough to power it. This facilitates installation thereof.

According to one particular embodiment of the communication method, the obtainment step is a step of receiving the first authentication data, said first data being transmitted by the management server.

The sending of the first data by the management server allows a flexible configuration. This allows the management server in particular to ask the transmission device to forward the messages sent by an additional terminal or, by contrast, to ask it to stop transmitting the messages sent by a terminal. This allows simpler management of a fleet of terminals The withdrawal of a terminal also makes it possible to improve security in the event that it is established that the terminal is a fraudulent terminal.

According to one particular feature of the communication method, the first authentication data are obtained in response to a message sent by said transmission device.

This embodiment is particularly suitable in the case where a server of the network is not able to directly interrogate the terminals connected to the network, and more particularly in this case the transmission device. In this embodiment, the transmission device periodically sends messages intended for the network server. The network server may then communicate information to the transmission device by responding to such a message.

According to one particular embodiment of the communication method, the step of establishing said session comprises:

a step of receiving a request to connect to said application server sent by said terminal, said request containing second authentication data; and a step of sending, in response to said connection request, a message accepting connection to said application server comprising third authentication data, said third data comprising at least one of the first items of authentication data and/or data generated by the transmission device.

According to one particular embodiment of the communication method, the first authentication data comprise a primary key, the second authentication data comprise a first random value and the third data comprise a second random value, and the method comprises a step of generating a secondary key by applying a predefined function to said primary key, to the first random value and to the second random value.

A secondary session key is a key derived from the primary key. This key is calculated by the transmission device from data generated by the terminal and data available to the transmission device.

Data, called third data, are transmitted to the terminal such that said terminal calculates the same secondary key.

The generation of one and the same key by the terminal, on the one hand, and by the transmission device, on the other hand, allows mutual authentication of the two equipments.

According to one particular embodiment of the communication method, the session establishment data that are transmitted comprise said secondary key.

The secondary key is necessary for the application server to decrypt the messages sent by the terminal. The transmission of this secondary key calculated by the transmission device allows the application server to be able to decrypt the messages generated by the terminal.

According to one particular embodiment of the communication method, the second random value is generated by the transmission device.

The generation of the second random value by the transmission device makes it possible to bolster security during the phase of mutual authentication of the terminal and of the transmission device.

According to one particular embodiment of the communication method, the third data comprise a terminal address generated or received by the transmission device.

This embodiment is particularly suitable for architectures in which the addresses of the equipments are not fixed and vary regularly, for example at each session.

The address of the terminal is generated by the transmission device or by the management server or else a server of the network and transmitted, by the management server and/or the network server, to the transmission device.

As an alternative, it may be recorded beforehand in the transmission device.

The invention also relates to a management server able to communicate with a transmission device via a gateway equipment forming a node of a telecommunications network and a network server of a telecommunications network, the transmission device being able to communicate via a radio link with the gateway equipment forming a node of a telecommunications network.

The management server comprises:

a reception module configured so as to receive establishment data for a communication session established between the transmission device and a terminal configured so as to connect to an application server via the network server, said communication session being established using at least one of the first items of authentication data obtained by the transmission device, the first authentication data being associated with at least one identifier of the terminal; and a processing module able to command, following the reception of said session establishment data, recording of information relating to the established session in association with the identifier of the terminal in a memory accessible to the network server.

The invention also relates to a management method implemented by a management server as described above.

The management method comprises the following steps:

receiving establishment data for a communication session established between the transmission device and a terminal configured so as to connect to an application server via the network server, said communication session being established using at least one of the first items of authentication data obtained by the transmission device, the first authentication data (KP1) being associated with at least one identifier of the terminal (IdC); and commanding, following the reception of said session establishment data, recording of information relating to the established session in association with the identifier of the terminal in a memory accessible to the network server.

The invention also relates to a system comprising a network server, an application server, at least one terminal configured so as to connect to an application server via the network server, a management server as described above and a transmission device as described above.

The invention also relates to a computer program product comprising instructions for implementing a transmission method or a management method as described above when this program is executed by a processor.

The invention thus relates to software or a program, able to be executed by a computer or by a data processor, this software/program containing instructions for commanding the execution of the steps of a transmission method or of a management method. These instructions are intended to be stored in a memory of a computer device, loaded and then executed by a processor of this computer device.

This software/program may use any programming language, and be in the form of source code, object code, or of intermediate code between source code and object code, such as in a partially compiled form, or in any other desirable form.

The computer device may be implemented by one or more physically separate machines and has the overall architecture of a computer, including components of such an architecture: data memory(ies), processor(s), communication bus(es), hardware interface(s) for connecting this computer device to a network or another equipment, user interface(s), etc.

The invention also relates to an information medium able to be read by a data processor and containing program instructions, such as mentioned above. The information medium may be any entity or device capable of storing the program.

Other particular features and advantages of the present invention will become apparent in the following description of embodiments, given by way of non-limiting example, with reference to the appended drawings, in which:

FIG. 1 is a diagram illustrating a system according to one particular embodiment of the invention;

FIG. 2 is a diagram showing a transmission device able to implement a transmission method according to one embodiment of the invention;

FIG. 3 is a diagram showing a management server able to implement a management method according to one embodiment of the invention;

FIG. 4 is a flowchart illustrating the various steps of a transmission method and of a management method according to one particular embodiment of the invention.

BRIEF DESCRIPTION OF THE DRAWINGS

The invention is implemented by means of software and/or hardware components. In this regard, the term "module" may correspond in this document equally to a software component, to a hardware component or to a set of hardware and/or software components, able to implement a function or a set of functions, according to what is described below in respect of the module in question.

A software component corresponds to one or more computer programs, one or more subroutines of a program, or more generally to any element of a program or of software.

Such a software component is stored in memory and then loaded and executed by a data processor of a physical entity (terminal, server, gateway, set-top box, router, etc.), and is able to access the hardware resources of this physical entity (memories, recording media, communication buses, electronic input/output cards, user interfaces, etc.).

In the same way, a hardware component corresponds to any element of a hardware assembly. This may be a programmable hardware component or one with an integrated processor for executing software, for example an integrated circuit, a chip card, an electronic card for executing firmware, etc.

DETAILED DESCRIPTION OF ILLUSTRATIVE EMBODIMENTS

One embodiment of a transmission method and of a management method will now be described with reference to FIGS. 1 to 4.

Figure 1:
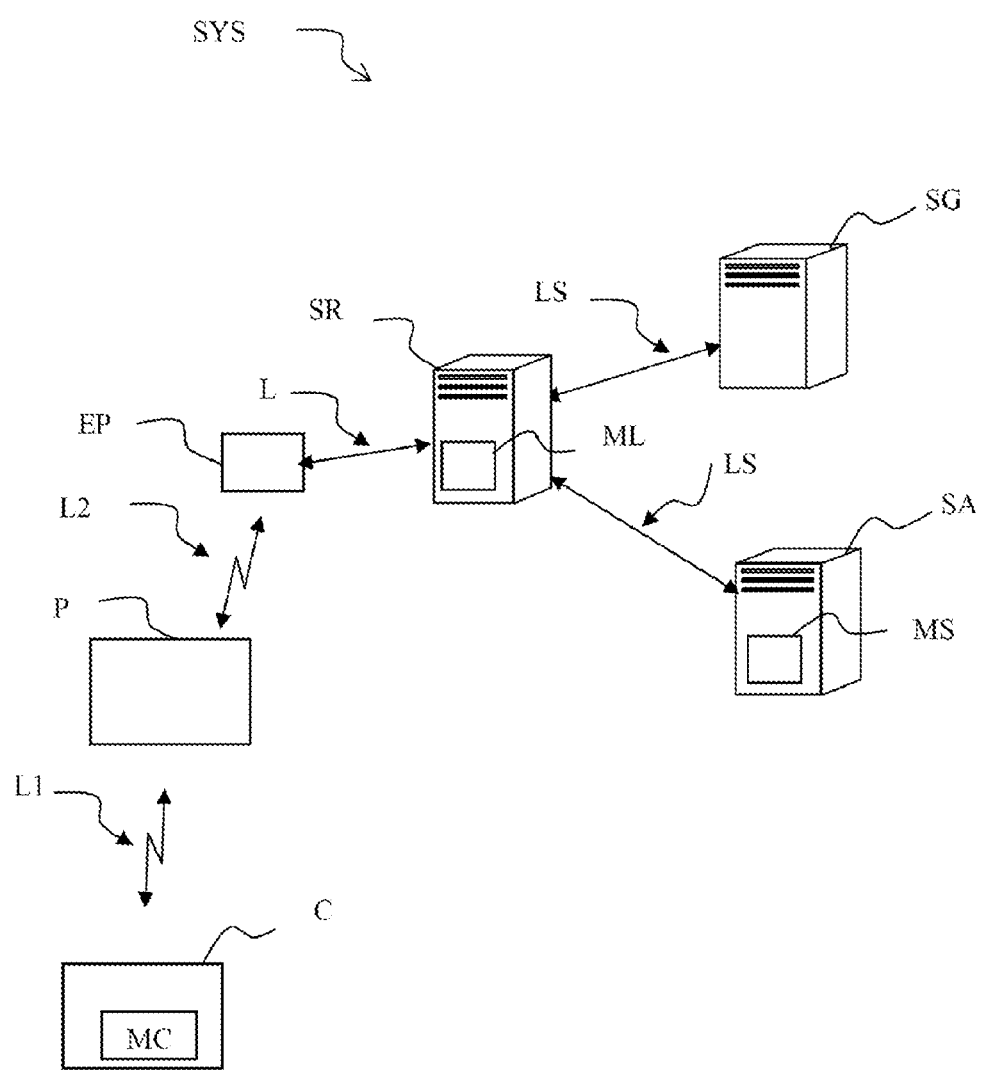

FIG. 1 shows a communication system SYS according to the invention in one particular embodiment.

In the example under consideration in FIG. 1, the communication system SYS is based on a wide-area telecommunications network implementing the LoRaWAN™ protocol. As is known, the LoRaWAN™ protocol is particularly well suited in the context of the Internet of Things to allow various communicating objects to exchange with servers on the Internet.

There is no limit attached to the nature of the communicating objects. These may be various terminals such as sensors, actuators, or any other type of object. As is known, such objects, due to their hardware and/or software constraints, are not able to connect to the Internet via conventional access networks such as WiFi, cellular or wired networks in order to access the application services to which they are attached: they communicate with these services via a telecommunications network adapted to their constraints, such as LoRaWAN™, using a star topology.

The communication system SYS comprises at least one transmission device P, at least one terminal C, at least one gateway equipment EP, a network server SR, a management server SG and at least one application server SA.

There is no limit attached to the number of application servers, to the number of transmission devices, to the number of gateway equipments or to the number of terminals.

The network server SR is able to communicate with the management server SG and the application server SA via a link LS.

The link LS is for example a wired link

The link LS is preferably secure.

The gateway equipment EP is able to communicate with one or more terminals via a radio link, on the one hand, and to communicate with the network server or other equipments of the network via a communication link L, on the other hand.

The communication link L is for example a wired or cellular link

There is no limit associated either with the type of the link LS or with the type of the link L.

The gateway equipment EP is in particular able to communicate with the transmission device P via a radio link L2.

As is known, the network server SR is responsible for filtering and checking the integrity and the authenticity of the messages received via the link L before transmitting them to the application servers in question.

The network server SR also has access to a memory ML containing a list LT of the connected terminals. The list LT comprises in particular, for each connected terminal, an identifier of said terminal in association with information relating to the communication session established for this terminal. This information is for example an identifier of the application server to which it is connected, a session key, the address assigned to the connected terminal, etc.

The information contained in the list LT allows the network server SR to perform integrity checks before transmitting or not transmitting a received message.

The information recorded for a connected terminal is for example removed from the list LT at the end of the communication session.

The data exchanged between the various servers SR, SA and SG of the network R are indifferently encrypted with shared keys or private-public key pairs or any other encryption method, or transmitted in open form. There is no limit associated with how these data are exchanged.

The terminal C is configured so as to communicate with the application server SA via the network server SR, and possibly via gateways or base stations.

More precisely, the terminal C is configured so as to send and receive data via a radio link The terminal C is for example a water meter.

The application server SA is for example a server of a water supplier able to process the data fed back by the water meter C and to provide an application service. This application service is for example the drawing up of a bill from the fed-back data, and the provision of this bill to a user associated with the meter C. The user may moreover be provided with a detailed history of his consumption on a web portal of the water supplier, etc.

The terminal C is configured so as to communicate with the application server SA via the network server SR, and possibly via gateways or base stations.

This means that, when it is installed in a radio coverage area of the gateway equipment EP, it is able to communicate with the application server SA via a radio link between the terminal and the gateway equipment EP, via the gateway equipment EP, the link L, the network server SR and the link LS.

To this end, the terminal C contains a memory MC in which an identifier IdC of the terminal C, an identifier IdS of the application server SA associated with the terminal C and a primary (or master) cryptographic key KP1 were recorded during a preliminary initialization phase, for example during installation thereof. The primary key KP1 is for example stored in a secure memory of the terminal C.

The primary key KP1 is also stored in a secure memory of the application server SA, for example in association with the identifier IdC of the terminal C.

It is assumed here that the terminal C is installed in an area, called black spot, where it does not directly access either a server of the network or a gateway equipment. More precisely, the radio signals sent by the terminal C do not reach a gateway equipment EP of the network.

The terminal C is for example situated underground, for example in a cellar of a building, in a sheet metal building, etc.

The transmission device P, according to the invention, is configured so as to communicate with the management server SG via the network server SR, and via the gateway equipment EP.

The transmission device P is configured so as to communicate with the gateway equipment EP via a radio link L2.

The transmission device P is also able to receive the radio signals sent by the terminal C and to send radio signals. The terminal C and the transmission device P thus communicate via a radio link L1.

In the described embodiment, the radio links L1 and L2 are links using low-bitrate and low-consumption LoRa technology. The sent and received radio signals are long-range low-bitrate (less than 50 Kbits/s) signals.

As an alternative, the links L1 and L2 are radio links of different types.

Figure 2:
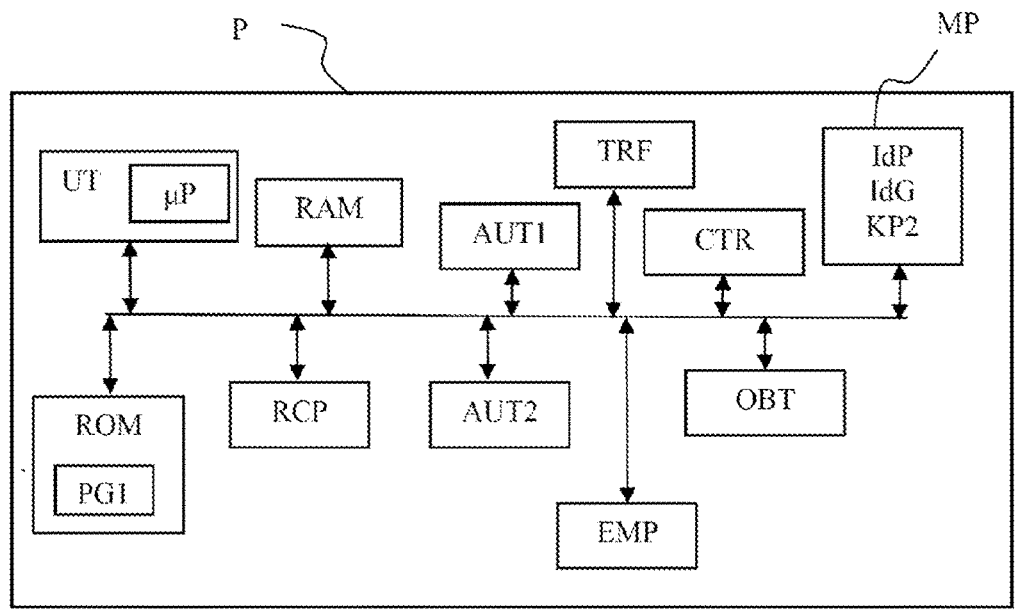

As illustrated in FIG. 2, the transmission device P comprises, as is known, in particular a processing unit UT equipped with a microprocessor, a ROM read-only memory, and a RAM random access memory.

Figure 4:
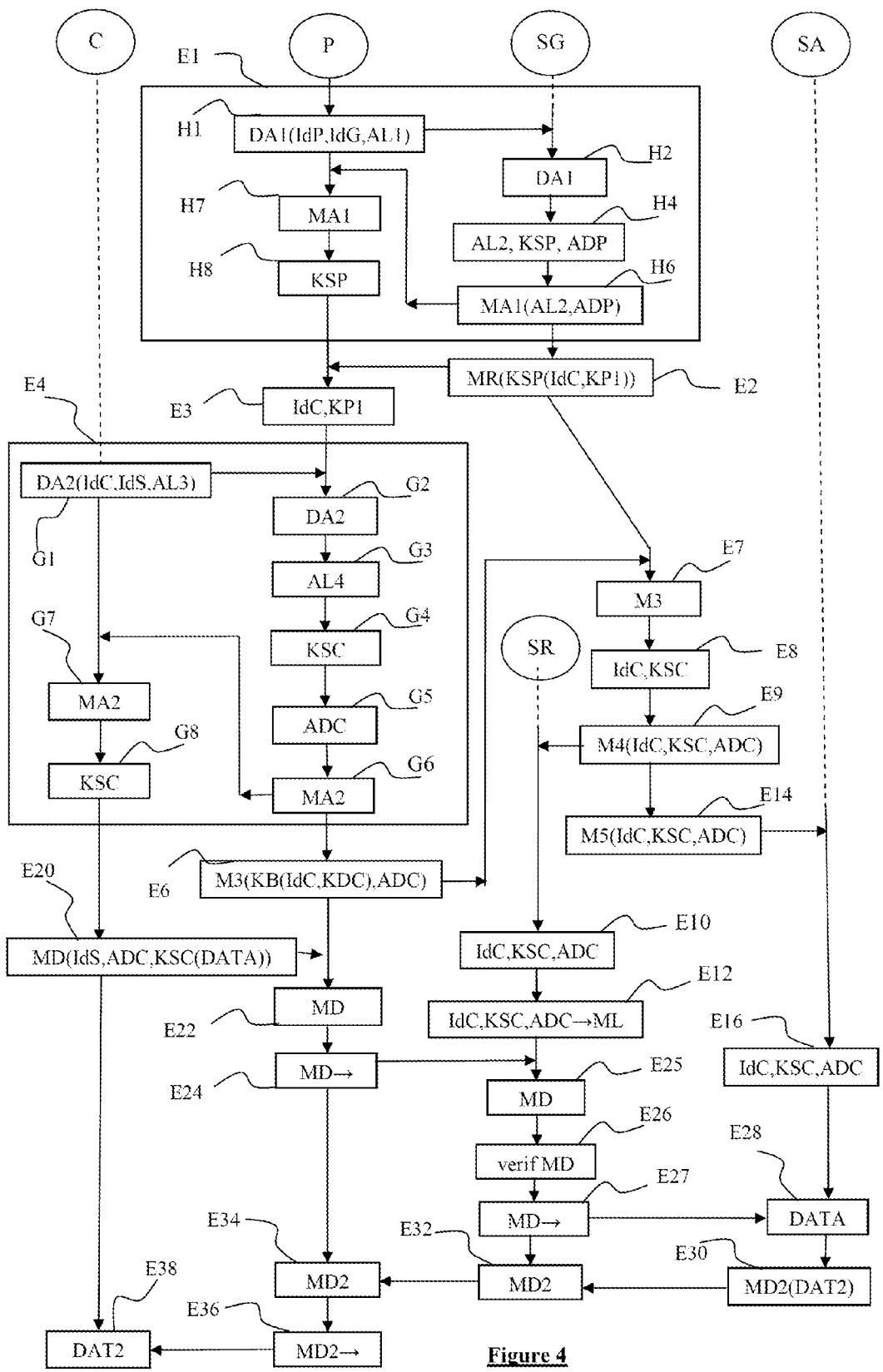

The ROM read-only memory contains registers storing a computer program PG1 containing program instructions designed to implement a transmission method according to one embodiment of the invention that is described later on with reference to FIG. 4.

The transmission device P also comprises a memory MP, for example a secure memory, in which an identifier IdP of the transmission device P, an identifier IdG of the management server SG associated with the transmission device P and a primary (or master) cryptographic key KP2 were recorded during a preliminary initialization phase, for example during installation thereof. The primary key KP2 represents a second primary key within the meaning of the invention.

The transmission device P also comprises an obtainment module OBT, a reception module RCP, a first authentication module AUT1, a second authentication module AUT2, a control module CTR, a sending module EMP and a second transfer module TRF.

The reception module RCP is configured so as to receive radio signals sent via the link L1, typically by the terminal C, on the one hand, and radio signals sent via the link L2, typically by the gateway equipment EP, on the other hand.

The sending module EMP and the transfer module TRF are configured so as to send radio signals.

Figure 3:
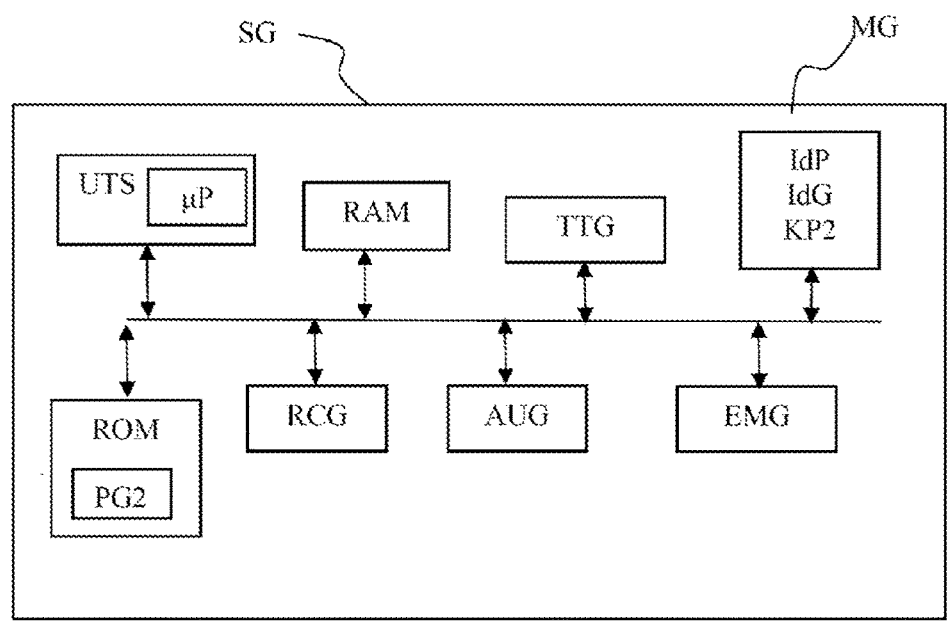

As illustrated in FIG. 3, the management server SG comprises, as is known, in particular a processing unit UTS equipped with a microprocessor, a ROM read-only memory, and a RAM random access memory.

The ROM read-only memory contains registers storing a computer program PG2 containing program instructions designed to implement a management method according to one embodiment of the invention that is described later on with reference to FIG. 4.

The server SG also comprises a memory MG, for example a secure memory, in which an identifier IdG of the management server SG, an identifier IdP of the transmission device P and the primary key KP2 were recorded during a preliminary phase.

The primary (or master) cryptographic key KP2 associated with the management server SG may be recorded in a memory of the network server SR in association with the identifier IdG of the management server SG and with the identifier IdP of the transmission device P.

The primary key KP2 is thus shared between the transmission device P and the network server SR.

The management server SG also comprises a reception module RCG, an authentication module AUG, a transmission module EMG and a processing module TTG.

One embodiment of a transmission method and of a management method, implemented in the system SYS, will now be described with reference to FIG. 4.

In a step E1, the transmission device P and the management server SG establish a communication session SC2 in which they authenticate one another. This authentication step comprises steps H1 to H8 in the described embodiment.

In a step H1, the first authentication module AUT1 of the transmission device P transmits a connection request DA1 to the management server SG via the network server SR. The connection request DA1 is sent by the transmission device P via the radio link L2. It is relayed to the network server SR by the gateway equipment EP via the link L, and then forwarded to the management server SG via the link LS.

The connection request DA1 contains the identifier IdP of the transmission device P, the identifier IdG of the management server SG to which the transmission device P requests to be connected and a random value AL1 generated by the transmission device P.

The connection request DA1 is for example a JoinRequest message defined in the LoRaWAN™ standard.

The connection request DA1 is received by the reception module RCG of the management server SG in a step H2.

In a step H4, following the reception of the request DA1, the authentication module AUG of the management server SG generates a random value AL2. It then generates a session key KSP by applying a predefined mathematical function F1 using the following parameters: the primary key KP2, the received random value AL1, the random value AL2.

The generation of a session key, also called a derived key, from a primary (or master) key is a technique known to those skilled in the art and will not be described here.

The function F1 is for example an AES (for "Advanced Encryption Standard") function.

There is no limit associated with the function F1.

In step H4, the authentication module AUG of the management server SG also generates an address ADP for the transmission device P.

Then, in a step H6, the authentication module AUG of the management server SG generates and sends a connection acceptance message MA1 in response to the authentication request DA1. The message MA1 contains in particular the random value AL2 and the generated address ADP. It may also contain connection parameters.

The message MA1 is for example a JoinAccept message defined in the LoRaWAN™ standard.

Information relating to the connection, that is to say to the established session, is recorded by the network server SR or by the management server SG in the list LT of the memory ML. This information is for example the identifier IdC of the terminal C, the identifier IdG of the management server SG and the session key KSP.

The message MA1 is received by the reception module RCP of the transmission device P in a step H7.

Step H7 is followed by a step H8 in which the first authentication module AUT1 of the transmission device P for its part generates the session key KSP. The session key KSP is generated by applying the function F1 to the primary key KP2 stored in the memory MP of the transmission device P, the first random value AL1 generated by the transmission device P and the second random value AL2 received in the message MA1. The generation of the key KSP by the transmission device P is similar to that described with reference to step H4.

In the described embodiment, the session establishment comprises mutual authentication of the transmission device P and of the management server SG.

As an alternative, the session key KSP is for example generated by a security device (not shown) and recorded beforehand in the transmission device P, on the one hand, and in the management server SG and/or the network server SR, on the other hand.

Thus, following step E1, the transmission device P, on the one hand, and the management server SG have the same session key KSP. In other words, the session key KSP is shared by the transmission device P and the management server SG.

Step E1 is followed by a step E2 in which the processing module TTG of the management server SG generates and sends a message MR intended for the transmission device P. The message MR contains the identifier IdC of the terminal C and the primary key KP1 associated with this terminal.

The message MR is transmitted via the network server SR and the gateway equipment EP.

The data of the message MR are encrypted with the session key KSP by the management server SG or by the network server SR.

The message MR is for example transmitted in response to an interrogation message sent by the transmission device P.

In a step E3, following the reception of the message MR, the obtainment module OBT of the transmission device P obtains, using the previously calculated session key KSP, the data contained in the message MR, in particular the identifier IdC and the primary key KP1. It then records these data in a memory of the transmission device DP, for example the memory MP.

As an alternative, the identifier IdC and the associated primary key KP1 are recorded in the transmission device P during an initialization phase prior to the authentication. It is then not necessary for the management device SG to transmit these data.

The primary key KP1 represents first authentication data within the meaning of the invention.

As described later on, the first authentication data may also comprise a random value and/or an address to be assigned to the transmission device P.

Also, as an alternative, the first authentication data do not comprise the primary key KP1. In this variant, the data generated from the primary key KP1 are generated by the management server SG or by the network server SR and transmitted to the transmission device P via the communication session established between the transmission device P and the management server SG.

In a step E4, the terminal C and the transmission device P establish a communication session SC1 in which they authenticate one another. This communication session establishment step E4 comprises steps G1 to G8 in the described embodiment.

In step G1, the terminal C sends a connection request DA2.

The connection request DA2 contains the identifier IdC of the terminal C, the identifier IdS of the application server SA and a random value AL3 generated by the terminal C.

The random value AL3 represents second authentication data within the meaning of the invention.

The connection request DA2 is for example a JoinRequest message defined in the LoRaWAN™ standard.

In step G1, an integrity code calculated from the primary key KP1 may also be transmitted to the transmission device P. As is known, this integrity code allows the transmission device P to authenticate the terminal C.

The connection request DA2 is received by the reception module RCP of the transmission device P in a step G2.

In a step G3, the second authentication module AUT2 of the transmission device P generates a random value AL4.

As an alternative, the random value AL4 is generated by the management server SG and transmitted thereby to the transmission device P, for example in step E2 described above.

If an integrity code is transmitted by the terminal C in step G1, the device may check this code using the primary key KP1 that it holds. If the transmission device P determines that this code is not valid, the communication session between the terminal C and the transmission device P is not established and the process stops.

Similarly, if the terminal identifier contained in the connection request DA2 is not known to the transmission device P, the transmission device P refuses to establish the communication session between the terminal C and the transmission device P.

In a step G4, the second authentication module AUT2 of the transmission device P generates a session key KSC by applying a predefined mathematical function F2 to the following parameters: the primary key KP1, the received random value AL3, the random value AL4.

As an alternative, the function F2 contains additional parameters.

The mathematical function F2 is for example identical to the mathematical function F1.

As an alternative, the functions F1 and F2 are two different mathematical functions.

In a step G5, the second authentication module AUT2 of the transmission device P generates an address ADC for the terminal C.

As an alternative, the address ADC of the terminal C is generated by the management server SG or by the network server SR and transmitted thereby to the transmission device P. This address ADC is then for example transmitted in step E2 described above.

Then, in a step G6, the second authentication module AUT2 of the transmission device P sends a connection acceptance message MA2 in response to the authentication request DA2. The message MA2 contains in particular the random value AL4 and the address ADC assigned to the terminal C. It may also contain connection parameters.

The message MA2 is for example a JoinAccept message defined in the LoRaWAN™ standard.

The random value AL4 and the address ADC represent third authentication data within the meaning of the invention.

In step G6, the transmission device P also transmits an integrity code calculated from the primary key KP1. As is known, this integrity code allows the terminal C to authenticate the transmission device P.

As an alternative, this code is not transmitted.

The message MA2 is received by the terminal C in a step G7.

Step G7 is followed by a step G8 in which the authentication module AUC of the terminal C for its part generates the session key KSC. Step G8 is similar to step G4.

Thus, following step E4, the terminal C, on the one hand, and the transmission device P have the same session key KSC. In other words, the session key KSC is shared by the terminal C and the transmission device P.

In a step E6, the sending module EMP of the transmission device P sends a message M3. The message M3 contains the identifier IdC of the terminal C, the session key KSC generated by the transmission device P and the generated address ADC. The data contained in the message M3 are encrypted with the session key KSP shared between the transmission device P and the management server SG.

The data contained in the message M3 represent session establishment data DE within the meaning of the invention.

As a variant, the message M3 does not contain the key KSC and the message M3 contains data allowing the management server SG or the network server SR to generate this key, that is to say in particular the first random value AL3 and the second random value AL4.

In one particular embodiment, the transmission device P commands the deletion of the previously generated key KSB, for example after sending the message M3.

The session establishment data DE contained in the message M3 are received by the reception module RCG of the management server SG in a step E7.

Step E7 is followed by a step E8 in which the processing module TTG of the management server SG obtains the session key KSC and the address ADC by decrypting the data of the message M3 using the key KSP stored in one of its memories.

As an alternative, the data of the message M3 are decrypted by the network server SR and then transmitted to the management server SG.

In a step E9, the processing module TTG of the management server SG commands the recording of information IS relating to the established session in the list LT of the memory ML. To this end, it transmits a message M4 containing the identifier IdC, the session key KSC and the address ADC to the network server SR. These data are for example transmitted securely, for example using a key shared by the management server SG and the network server SR.

The identifier IdC of the terminal C, the session key KSC and the address ADC are received by the network server SR in a step E10.

Step E10 is followed by a step E12 in which the network server SR records information IS relating to the established session in association with the identifier IdC of the terminal C in the memory ML. The recorded information is for example the identifier IdS of the application server SA, the session key KSC and the address ADC.

In a step E14, the transmission module EMG of the management server SG transmits a message M5 containing the identifier IdC, the session key KSC and the address ADC to the application server SA. These data are for example transmitted securely. These data are for example transmitted using a key shared by the management server SG and the application server SA.

The identifier IdC of the terminal C, the session key KSC and the address ADC are received by the application server SA in a step E16.

In a step E20, performed after the steps described above, the terminal C having data DATA to be transmitted to the application server SA generates and sends a message MD.

The data DATA are for example measured data obtained by the terminal C.

More generally, the data DATA are data that the terminal C wishes to transmit to the application server SA and/or to the network server SR.

There is no limit associated with the type of data DATA of the data message MD.

The message MD contains the identifier IdS of the application server SA, the address ADC of the terminal C as well as the data DATA encrypted with the generated session key KSC generated by the terminal C.

The message MD is received by the reception module RCP of the transmission device P in a step E22.

The control module CTR of the transmission device P checks that the message MD comes from the terminal C and is intended for the application server SA (step E24).

If the check is positive, the control module CTR of the transmission device P commands the sending of the message MD by the second transmission module EMP of the transmission device P.

The data message MD sent by the terminal C, intended for the application server SA and received by the transmission device P, is thus forwarded by the latter.

If the check is negative, for example if the message MD received by the transmission device P is a message sent by a terminal for which the transmission device P has not received rights, for example the terminal identifier and associated first authentication data, or if the message MD sent by the terminal C is not sent to the application server SA, the message is not forwarded by the transmission device P.

The message MD, forwarded by the transmission device P, is received by the network server SR in a step E25.

In a step E26, the network server SR checks that the terminal C is registered in the memory ML containing a list of connected terminal identifiers in association with information relating to the sessions established for these terminals.

Using the data IS recorded in association with the identifier of the terminal C in the memory ML, the network server SR is also able to perform integrity checks on the message MD.

If the terminal is not registered in the memory ML or if the network server SR considers that the checks are not satisfactory, the message MD is not transmitted to the application server SA.

Otherwise, the message MD is transmitted by the network server SR to the application server SA in a step E27.

Step E27 is followed by a step E28 in which the application server SA obtains the data DATA using the session key KSC received in step E16.

In the described embodiment, in step E24, the message MD is forwarded without being processed by the transmission device P.

As an alternative, the message MD is encrypted with the session key KSP by the transmission device P before being transmitted and transits via the management server SG, where it is decrypted using the session key KSP generated by the management server SG and then transmitted by the management server SG to the application server SA.

Steps E20 to E28 may be reiterated one or more times.

One of steps E28 may be followed by a step E30 in which the application server SA having data DAT2 to be transmitted to the terminal C generates and transmits a message MD2 to the terminal C.

The data of the message MD2 are encrypted with the key KSC.

Step E30 is for example performed following the reception of an interrogation message by the application server SA.

In a step E32, similar to step E26, the message MD2 is received by the network server SR, which checks the message MD2 and forwards the message MD2 to the transmission device P via the gateway equipment EP.

The transmission device P receives the message MD2 in a step E34 via the reception module RCP.

In a step E36, the transfer module TRF of the transmission device P forwards the received message MD2, and the message MD2 is received by the terminal C in a step E38.

Steps H1, H7, H8, E3, G2, G3, G4, G5, G6, E6, E22, E24, E34 and E36 implemented by the transmission device P represent steps of the communication method according to one embodiment of the invention.

Steps H2, H4, H6, E2, E7, E8, E9 and E14 implemented by the management server SG represent steps of the management method according to one embodiment of the invention.

In the described embodiment, the session key KSC generated by the transmission device DP is transmitted by this device to the management server SG.

As an alternative, the random value AL3 generated by the terminal C and the random value AL4 generated by the transmission device P are transmitted to the management server SG instead of the session key KSC. The session key KSC is not transmitted. The session key KSC is then generated by the application server SA or by the network server by applying the mathematical function F2 to the random values AL3 and AL4 and to the primary key KP1.

In another particular embodiment, the random value AL2 and the address ADC of the terminal are generated by the management server SG, by the network server SR or by the application server SA, and then transmitted to the transmission device P. The session key KSC might not be generated by the transmission device P. In this case, only the random value AL3 generated by the terminal C is transmitted in association with the identifier IdC of the terminal C in step E6. The session key KSC is then generated by the application server SA by applying the mathematical function F2 to the random values AL3 and AL4 and to the primary key KP1.

In the described embodiment, when establishing a session with an application server, for example the management server SG or the application server SA, a terminal or a transmission device is authenticated by the server itself.

As a variant, such authentication may be performed by the network server or another equipment of the network, for example an authentication server of the network. In this variant, the data associated with an application server and required to implement the authentication are made available to the network server.

A secondary key generated from a primary key may be retained by the network server, which then authenticates and/or decrypts the messages from a terminal or from a transmission device before transmitting them, preferably via a secure link, to the application server in question.

Conversely, the messages generated by an application server are signed and/or encrypted with the secondary key by the network server before transmission to a terminal or to a transmission device.

A secondary key generated from a primary key may also be transmitted to the application server, which may then take responsibility for encrypting the messages before transmission and decrypting the received messages.

In the described embodiment, a session key is generated during each mutual authentication. A session key KSP is generated during the mutual authentication of the transmission device P and the management server SG, and a session key KSC is generated during the mutual authentication of the terminal C and the transmission device P.

These session keys are application session keys within the meaning of the LoRaWAN™ standard.

In LoRaWAN™ architectures, the security of the exchanges between the terminals and the application servers is ensured on two separate levels, i.e. at the network level via various integrity checks performed by the network server acting as intermediary between the terminals and the application servers and by the terminals themselves, and at the application level, through the encryption/decryption of the application data exchanged between the terminals and the application servers. Each of these mechanisms relies, during each session established by a terminal with an application server via the server of the network, on the known AES encryption algorithm used in the LoRaWAN™ protocol, parameterized either by way of cryptographic network session keys or by way of cryptographic application session keys. These cryptographic keys in this case have a size of 128 bits. It should be noted, however, that the invention easily makes it possible to contemplate symmetric encryption algorithms other than the AES encryption algorithm, as well as other key sizes.

The invention also applies to this architecture.

Thus, in one variant embodiment, during the mutual authentication required by the transmission device P, the authentication request DA1 sent by the transmission device P is intercepted by a network server SR of the LoRa™ network.

Following the reception of the authentication request DA1, the network server SR generates a network key KRP, on the one hand, and the session key KSP, on the other hand.

Similarly, the transmission device P also generates the network key KRP in addition to the session key KSP.

The messages transmitted by the transmission device P to the management server SG contain data encrypted by the session key KSP and then signed by the network key KRP. Each message is received by the network server SR, which checks the integrity and authenticity thereof by virtue of its network key KRP, and transmits them to the management server SG, which decrypts it with the session key KSP. As an alternative, if it has been mandated to do so, the network server SR may decrypt the message with the session key KSP and transmit the decrypted message to the management server SG via the preferably secure link LS.

Similarly, during the step of mutual authentication between the terminal C and the transmission device DP, a network key KRC may be generated from the primary key KP1 by the terminal C, on the one hand, and by the transmission device P, on the other hand.

The messages transmitted by the terminal C in step E20 are then also signed by the network key KRC.

As a variant of this embodiment, when receiving a data message encrypted with the session key KSC and signed with the network key KRC, from the terminal C, the transmission device P obtains the data DATA encrypted with the session key KSC, that is to say KSC(DATA), using the network key KRC. It then encrypts these encrypted data (KSC(DATA)) with the session key KSP, and then signs them with the network key KRP before transmitting the message thus obtained.

The message is obtained by the network server SR, which obtains and transmits the data encrypted with the session key KSP to the management server SG. This message is received by the management server SG, which obtains the data encrypted with the key KSC using its key KSP and transmits the obtained message. This message is finally received by the application server SA, which obtains the data DATA using the key KSC.

Although the present disclosure has been described with reference to one or more examples, workers skilled in the art will recognize that changes may be made in form and detail without departing from the scope of the disclosure and/or the appended claims.

The invention claimed is:

1. A transmission device able to communicate via a radio link with a gateway equipment forming a node of a telecommunications network and configured so as to communicate with a management server via said gateway equipment and a network server of said network, wherein the transmission device comprises:
    a processor; and
    a non-transitory computer-readable medium comprising instructions stored thereon, which when executed by the processor configure the transmission device to perform acts comprising:
    obtaining first authentication data associated with at least one terminal identifier identifying a terminal configured so as to connect to an application server via said network server;
    establishing a communication session between said transmission device and said terminal using at least one item of the first authentication data that are obtained;
    sending establishment data for said session, said data being intended for said management server, said management server being able to command, following reception of said data, recording of information relating to the established session in association with the identifier of the terminal in a memory accessible to the network server;
    receiving a first data message sent by said terminal and intended for said application server and/or receiving a second data message generated by the application server or the network server and intended for the terminal; and
    sending said received first and/or second data messages.

2. A transmission method implemented by a transmission device able to communicate via a radio link with a gateway equipment forming a node of a telecommunications network, said transmission device being configured so as to communicate with a management server via said gateway equipment and a network server of said network, wherein the method comprises:
    obtaining first authentication data associated with at least one terminal identifier identifying a terminal configured so as to connect to an application server via said network server;
    establishing a communication session between the transmission device and the terminal using at least one item of the first authentication data that are obtained;
    sending establishment data for said session, said data being intended for said management server, said management server being able to command, following reception of said session establishment data, recording of information relating to the established session in association with the identifier of the terminal in a memory accessible to the network server;
    receiving a first data message sent by the terminal and intended for said application server and/or a second data message generated by the application server or the network server and intended for the terminal; and
    sending said received first and/or second data messages.

3. The transmission method as claimed in claim 2, wherein the obtaining comprises receiving the first authentication data, said first authentication data being transmitted by the management server.

4. The transmission method as claimed in claim 2, wherein the first authentication data are obtained in response to a message sent by said transmission device.

5. The transmission method as claimed in claim 2, wherein the act of establishing said session comprises:
    receiving a request to connect to said application server sent by said terminal, said request containing second authentication data;
    sending, in response to said connection request, a message accepting connection to said application server comprising third authentication data, said third data comprising at least one item of the first authentication data and/or data generated by the transmission device.

6. The transmission method as claimed in claim 5, wherein the first authentication data comprise a primary key, the second authentication data comprise a first random value and the third data comprise a second random value, and wherein the method comprises generating a secondary key by applying a predefined function to said primary key, to the first random value and to the second random value.

7. The transmission method as claimed in claim 6, wherein the transmitted session establishment data comprise said secondary key.

8. The transmission method as claimed in claim 6, wherein the second random value is generated by the transmission device.

9. The transmission method as claimed in claim 6, wherein the third data comprise an address of the terminal generated or received by the transmission device.

10. A management server able to communicate with a transmission device via a gateway equipment forming a node of a telecommunications network and a network server of the telecommunications network, the transmission device being able to communicate via a radio link with the gateway equipment forming a node of a telecommunications network, wherein the management comprises:
    a processor; and
    a non-transitory computer-readable medium comprising instructions stored thereon, which when executed by the processor configure the management server to perform acts comprising:
    receiving establishment data for a communication session established between the transmission device and a terminal configured so as to connect to an application server via the network server; said communication session being established using at least one first item of authentication data obtained by the transmission device, the first item of authentication data being associated with at least one identifier of the terminal; and
    commanding, following the reception of said session establishment data, recording of information relating to the established session in association with the identifier of the terminal in a memory accessible to the network server.

11. A management method implemented by a management server able to communicate with a transmission device via a network server of a telecommunications network, wherein the method comprises:
    receiving establishment data for a communication session established between the transmission device and a terminal configured so as to connect to an application server via the network server, said communication session being established using at least one first item of authentication data obtained by the transmission device;
    the first item of authentication data being associated with at least one identifier of the terminal; and
    commanding, following the reception of said session establishment data, recording of information relating to the established session in association with the identifier of the terminal in a memory accessible to the network server.

12. A non-transitory computer-readable medium comprising a computer program stored thereon comprising program code instructions for executing a transmission method implemented by a transmission device when said program is executed by a processor of the transmission device, wherein the transmission device is able to communicate via a radio link with a gateway equipment forming a node of a telecommunications network, said transmission device being configured so as to communicate with a management server via said gateway equipment and a network server of said network, and wherein the instructions configure the transmission device to:

obtain first authentication data associated with at least one terminal identifier identifying a terminal configured so as to connect to an application server via said network server;

establish a communication session between the transmission device and the terminal using at least one item of the first authentication data that are obtained;

send establishment data for said session, said data being intended for said management server, said management server being able to command, following reception of said session establishment data, recording of information relating to the established session in association with the identifier of the terminal in a memory accessible to the network server;

receive a first data message sent by the terminal and intended for said application server and/or a second data message generated by the application server or the network server and intended for the terminal; and sending said received first and/or second data messages.

13. A non-transitory computer-readable medium comprising a computer program stored thereon comprising program code instructions for executing a management method implemented by a management server when said program is executed by a processor of the management server, wherein the management server is able to communicate with a transmission device via a network server of a telecommunications network, and wherein the instructions configure the management server to:

receive establishment data for a communication session established between the transmission device and a terminal configured so as to connect to an application server via the network server, said communication session being established using at least one first item of authentication data obtained by the transmission device;

the first item of authentication data being associated with at least one identifier of the terminal; and command, following the reception of said session establishment data, recording of information relating to the established session in association with the identifier of the terminal in a memory accessible to the network server.

\* \* \* \* \*